J. E. HOBBS.
ATTACHABLE SLEIGH SHOE FOR VEHICLE WHEELS.
APPLICATION FILED APR. 11, 1911.

1,127,762. Patented Feb. 9, 1915.

Witnesses
C. M. Walker
J. T. Walker

Inventor
John E. Hobbs
By Harold Goodwin
Attorney

UNITED STATES PATENT OFFICE.

JOHN E. HOBBS, OF NORTH BERWICK, MAINE.

ATTACHABLE SLEIGH-SHOE FOR VEHICLE-WHEELS.

1,127,762.

Specification of Letters Patent.

Patented Feb. 9, 1915.

Application filed April 11, 1911. Serial No. 620,433.

*To all whom it may concern:*

Be it known that I, JOHN E. HOBBS, a citizen of the United States, residing at North Berwick, in the county of York and State of Maine, have invented certain new and useful Improvements in Attachable Sleigh-Shoes for Vehicle-Wheels, of which the following is a specification.

My invention relates to sleigh runners or shoes for vehicle wheels, and the general object of the invention is to provide improved devices of this character to be secured to the wheels of vehicles in general, and especially to wheels of automobiles or motor vehicles, in icy or snowy weather, thus practically converting such vehicles into sleighs.

A further object of the invention is to provide improved attachments of the character described especially suited for use on the front, or steering wheels of motor or other vehicles in order to accommodate the motion of such wheels during the turning about, or around corners.

A further object of the invention is to provide, for general use on the wheels of the vehicles referred to, improved runners or shoes which are light, inexpensive, of graceful form and capable of being quickly and easily applied to or removed from the wheels.

With these objects in view, the invention consists in the improved construction, arrangement and combination of the parts of an article of the character mentioned, all as hereinafter fully described and afterward specifically pointed out in the appended claim.

In order that the construction and operation of the invention may be readily comprehended, I will now proceed to specifically describe it, in connection with the accompanying drawing, in which—

Figure 1:
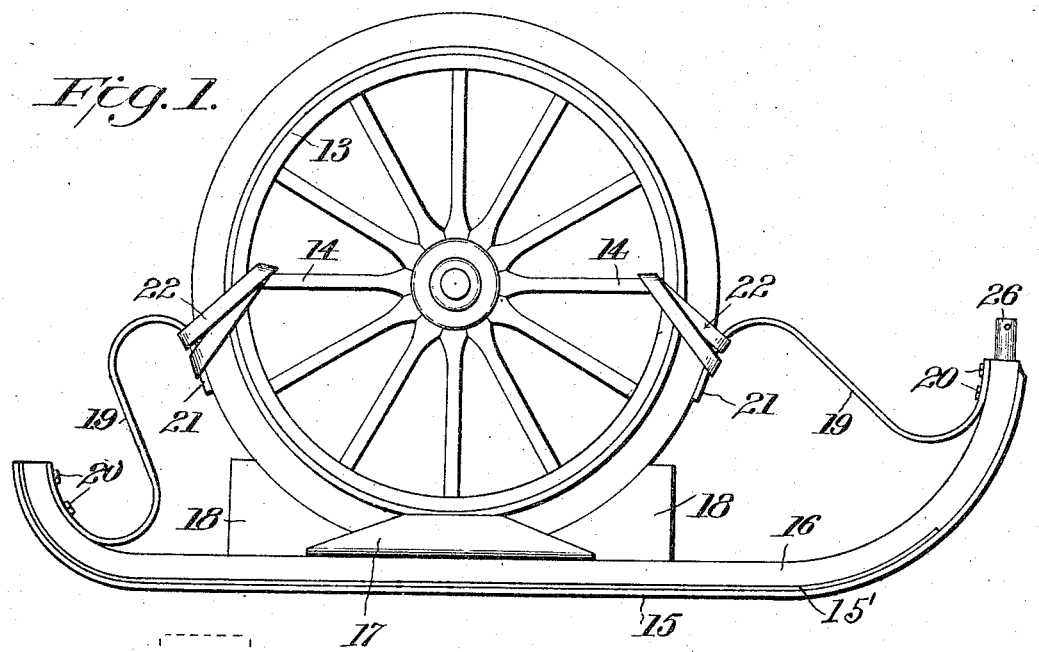
Figures 2, 3:
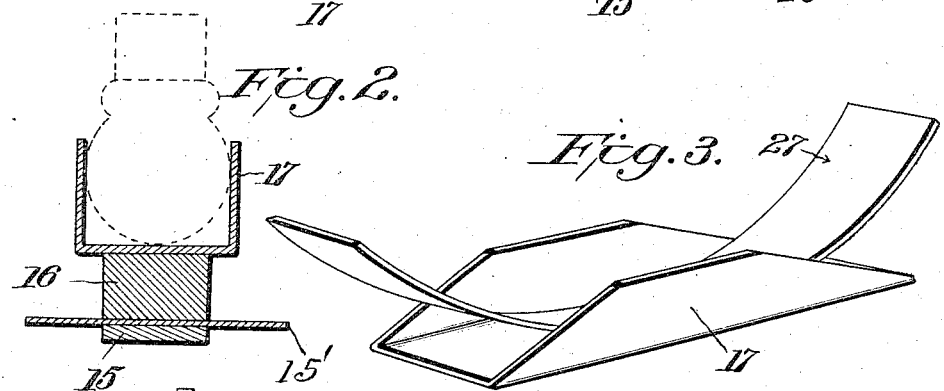
Figure 4:
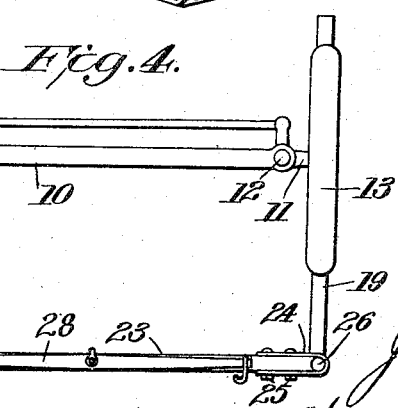

Figure 1 represents a view in side elevation of a detached automobile wheel having one of my improved shoes secured in position thereon. Fig. 2 represents a transverse sectional view taken through the rim portion of the wheel and through the cradle and runner. Fig. 3 represents a detail perspective view of the cradle, detached. Fig. 4 represents a plan view, partly diagrammatic, of an axle having a pair of automobile wheels journaled on the spindles with my improved shoes secured to the wheels and coupled together for joint operation.

Like characters of reference mark the same parts wherever they occur in any of the figures of the drawing.

Referring specifically to the drawing, 10, Fig. 4, indicates any ordinary form of axle for an automobile wheel provided with spindles 11 connected thereto by knuckle joints 12, said spindles carrying wheels 13 of any preferred form suitable for motor vehicles, the wheels being provided with ordinary spokes 14, as shown in Fig. 1, of any preferred form, as well as tires and rims of any ordinary construction as may be desired by the user.

At 15 is shown a strip of any ordinary iron, suitable to form the bottom of shoes or runners, said strip being straight for the greater portion of its length and bent up at its front and rear ends to conform to the shape of the main body or base 16 of the shoe to the bottom of which it is attached by any suitable means. Disposed between the strip 15 and main body 16 of the base of the runner is a strip 15', which, as best shown in Fig. 2, extends laterally upon opposite sides of the parts 15 and 16 of the base of the runner. This results in a comparatively wide shoe composed of the parts 15, 16 and 15'. This shoe is thus rendered wide by virtue of the strip 15' and provides a wide path for the driving wheels in deep snow.

At 17 is shown in perspective, in Fig. 3, what I denominate, a cradle consisting of a thin piece of plate or sheet metal comprising a main portion or base and an upright flange upon each side thereof, at right angles to the base and parallel with each other.

Suitably secured upon the main body or base 16, are two triangular blocks of wood 18, the adjacent faces of which are seated within the side flanges of the cradle 17, while the upper faces serve as a base upon which rests the tire of a wheel 13.

Secured upon the top of the front and rear upturned ends of the wooden base or body 16 of the shoe are two S-shaped strips or braces 19, the securing means being bolts or similar fastenings, 20, which may pass entirely through the base or body 16 and tread 15 and serve to hold said tread, body, and braces together.

The unattached ends 21 of the braces 19 are turned downward to rest under the tires of the wheel 13 at points below the horizontal level of the hub or axle, and these ends 21 are secured in position on the tire of the wheel by means of double leather straps 22 which pass around the braces and the tire and rim of the wheel, and over the horizontal spokes 14, thus serving to securely support the shoe in vertical position, leather straps being preferred for this purpose on account of flexibility, ease of application, and non-liability of marring the finished surfaces of the wheel with which they come in contact.

In Fig. 4, I have shown a pair of my improved shoes coupled together or conjoined by means of a coupling rod 23 which carries at each end a metal strap 24 secured by bolts or other suitable fastenings 25, said straps forming loops to pass over vertical pins 26 projecting upward from the upturned end of the body or base 15 of the shoe.

The cradle may or may not be provided with supports for the wheel tire to take the place of the wooden blocks 18. When so provided, these supports consist of a piece of metal hoop fitting upon the periphery of the tire for substantially two-fifths of its circumference as indicated at 27 in Fig. 3, the same being readily secured to the base of the cradle by means of rivets or other suitable fastenings. When this metallic support for the tire is used, the wooden blocks 18 may be also used in which instance they will be slipped in between the base of the cradle and the metal support 27.

The joint between the coupling rod 23 and the upright pins 26 of the shoes is pivotal or swiveled so that when the wheels and spindles are turned upon the knuckle joints 12, in the act of steering, there will be a conjoint simultaneous movement of the two shoes so that there will be no tendency to cause either of them to slip out of place or to be moved from its normal position, which is parallel with the opposite shoe. Without such a swiveled coupling between the shoes, it would be impracticable to use them upon wheels used for steering in the manner in which automobile wheels are used.

Such shoes as herein described can be manufactured at substantially one-half the cost of hub runners, and can be as quickly and easily applied and removed. They may be used on all kinds of business wagons in cities and towns where frequent changes from wheels to runners are necessary and they may be used to advantage on fire apparatus.

The provision of the coupling bar prevents wabbling and strain on the gear during the lateral movement of the wheels while turning in the act of steering or skidding and the coupling rod is made sufficiently stiff to resist any sidewise thrust on the ends of the shoes, and is preferably made of wood. In horse drawn vehicles a whiffletree 28 should be applied to the bar 23, in which event the connection between the bar 23 and pins 26 may or may not be a swiveled joint.

The upturned pins upon which the coupling bar is mounted may consist of the ends of the wooden base itself, or they may be metal pins attached thereto. In either instance, the pins will be covered with leather to prevent rattling.

It will be obvious to those skilled in the art, that various changes may be made in the construction of the several parts described, without departing from the spirit and scope of the invention.

Having thus fully described my invention, what I claim as new and desire to secure by Letters Patent of the United States is:

The combination with a wheel and a sleigh runner, of a cradle attached to said runner, said cradle being substantially U-shaped in cross section and having opposite side members engaging the opposite sides of the wheel, blocks attached to said runner and having opposite portions engaging the ends of the cradle and retaining the latter in position upon said runner, said blocks engaging the opposite sides of the cradle and preventing lateral movement of said cradle, said blocks having upper curved faces conforming to the curvature of the wheel, resilient strips attached to the opposite ends of the runner, said resilient strips having straight intermediate portions and curved ends, the inner of which engages the wheel and conforms to the curvature of the latter, and means for attaching said resilient strips to the wheel.

JOHN E. HOBBS.

Witnesses:
ADDIE M. GRAY,
ELIZABETH K. HOBBS.

Correction in Letters Patent No. 1,127,762.

It is hereby certified that in Letters Patent No. 1,127,762, granted February 9, 1915, upon the application of John E. Hobbs, of North Berwick, Maine, for an improvement in "Attachable Sleigh-Shoes for Vehicle-Wheels," an error appears in the printed specification requiring correction as follows: Page 1, line 51, for the word "plan" read *plane*; and that the said Letters Patent should be read with this correction therein that the same may conform to the record of the case in the Patent Office.

Signed and sealed this 23rd day of March, A. D., 1915.

[SEAL.]
J. T. NEWTON,
*Acting Commissioner of Patents.*